United States Patent
Wang et al.

(10) Patent No.: US 8,837,802 B2
(45) Date of Patent: Sep. 16, 2014

(54) IMAGE ANALYSIS SYSTEM AND METHOD FOR DETERMINING CANCEROUS CELLS

(75) Inventors: Hsiang-Chen Wang, Chiayi County (TW); Chun-Ping Jen, Chiayi County (TW); Tsung-Chih Lin, Chiayi County (TW); Ta-Wei Chien, Chiayi County (TW); Ju-Hsiu Hsiao, Chiayi County (TW); Ching-Te Huang, Chiayi County (TW)

(73) Assignee: National Chung Cheng University, Chiayi County (TW)

( * ) Notice: Subject to any disclaimer, the term of this patent is extended or adjusted under 35 U.S.C. 154(b) by 115 days.

(21) Appl. No.: 13/417,371

(22) Filed: Mar. 12, 2012

(65) Prior Publication Data
US 2013/0236080 A1 Sep. 12, 2013

(51) Int. Cl.
*G06K 9/00* (2006.01)
(52) U.S. Cl.
USPC .......................................... 382/133; 382/128
(58) Field of Classification Search
None
See application file for complete search history.

(56) References Cited

U.S. PATENT DOCUMENTS

| | | | | |
|---|---|---|---|---|
| 8,098,894 B2* | 1/2012 | Soderstrom | | 382/104 |
| 8,332,424 B2* | 12/2012 | Flynn et al. | | 707/769 |
| 2002/0127546 A1* | 9/2002 | Anderson et al. | | 435/5 |
| 2003/0138770 A1* | 7/2003 | Anderson et al. | | 435/5 |
| 2006/0240862 A1* | 10/2006 | Neven et al. | | 455/550.1 |
| 2008/0317325 A1* | 12/2008 | Ortyn et al. | | 382/133 |
| 2012/0147142 A1* | 6/2012 | Lee et al. | | 348/46 |

* cited by examiner

*Primary Examiner* — Nancy Bitar
(74) *Attorney, Agent, or Firm* — Alan Kamrath; KAMRATH IP Lawfirm, P.A.

(57) ABSTRACT

An image analysis system for determining cancerous cells includes an acquisition module, an image capturing module and a multi-spectral image reproduction module. A method for determining cancerous cells includes a spectral database establishing procedure of cancerous cells and a cell determining procedure of multi-spectral image reproduction. The spectral database establishing procedure includes a penetration spectrum analysis step and a database establishing step. The cell determining procedure is based on the cancerous spectrum database and includes an image capturing step, a cell location contouring step, a penetration spectrum analyzing step, a classifying step, a color gaining step, an image reproduction step and a cell determining step.

5 Claims, 7 Drawing Sheets

IMAGE ANALYSIS SYSTEM AND METHOD FOR DETERMINING CANCEROUS CELLS

BACKGROUND OF THE INVENTION

1. Field of the Invention

The present invention relates to an image analysis system and, more particularly, to an image analysis system and method for determining cancerous cells.

2. Description of Related Art

A conventional biomedical cell determining method utilizes diffuse and random collisions to achieve a biomedical reaction. It will take a few hours or a few days to accomplish the determination. The conventional biomedical determining method is also manually controlled, such that a required precision may not be reached. A conventional flow cytometer and a conventional biochip are also provided for determining cells to shorten the determination period and improve the precision. However, the equipment of the conventional flow cytometer and the conventional biochip are expensive and require more biological samples and complicated chemical steps, such that they are not suitable for practical application.

With the development of multi-spectral image reproduction, charge-coupled devices (CCD), microscopes and filters are applied for determining cells. Based on the differences of spectrum algorithms, a conventional support vector machine's determination (SVM determination) and a conventional Winer's estimation method are utilized for determining cells. The SVM determination categorizes the cells to recognize the cells, requires liquid-crystal tunable filters (LCTF) and precisely controls the exposure time of the CCD. Therefore, the SVM determination has more requirements on equipment. The Winer's estimation method requires more controllable optical parameters and is not practically applicable.

To overcome the shortcomings, the present invention provides an image analysis system and a method for determining cancerous cells to mitigate or obviate the aforementioned problems.

SUMMARY OF THE INVENTION

The main objective of the invention is to provide an image analysis system for determining cancerous cells that includes an acquisition module, an image capturing module and a multi-spectral image reproduction module. The acquisition module includes a carrier unit, an illuminating unit and an enlarging unit. The carrier unit is provided for loading a sample of suspected cancerous cells. The illuminating unit is provided for illuminating the sample of the suspected cancerous cells on the carrier unit as a lighting source. The enlarging unit is disposed on the carrier unit for enlarging an image of the sample of the suspected cancerous cells to be recognized. The image capturing module is located at an output path of the acquisition module and includes a charge-coupled device, a lens unit and a capturing unit. The charge-coupled device receives an enlarged image of the sample of the suspected cancerous cells from the image enlarging unit. The lens unit is mounted on the charge-coupled device and is focused on the enlarged image to sharpen the enlarged image and transmit the sharpened enlarged image of the suspected cancerous cells to the charge-coupled device. The capturing unit is connected with the charge-coupled device to capture the sharpened enlarged image of the suspected cancerous cells. The multi-spectral image reproduction module utilizes a spectral analysis, a color gain and an image reproduction to retreat the sharpened enlarged image of the suspected cancerous cells captured from the capturing unit, such that the reproduction of the enlarged image of the suspected cancerous cells is provided for a doctor to recognize a stage of the suspected cancerous cells.

Another objective of the invention is to provide a method for determining cancerous cells that includes a spectral database establishing procedure of cancerous cells and a cell determining procedure of multi-spectral image reproduction. The spectral database establishing procedure includes a penetration spectrum analysis step and a database establishing step.

The penetration spectrum analyzing step is: utilizing a multi-spectral analysis analyzing the cancerous cells of four cancerous stages to calculate an average penetration spectrum to obtain spectrum features of the cells of the four cancerous stages.

The database establishing step is: establishing a cancerous spectrum database based on the spectrum features of the cells of the four cancerous stages.

The cell determining procedure is based on the cancerous spectrum database and includes an image capturing step, a cell location contouring step, a penetration spectrum analyzing step, a classifying step, a color gaining step, an image reproduction step and a cell determining step.

The image capturing step is: capturing an image of suspected cancerous cells.

The cell location contouring step is: utilizing an algorithm to contour the suspected cancerous cells in the image to recognize the locations of the suspected cancerous cells.

The penetration spectrum analyzing step is: utilizing the multi-spectral analysis to analyze the contoured suspected cancerous cells in the image to obtain the average penetration spectrum of the contoured suspected cancerous cells.

The classifying step is: classifying the image of the suspected cancerous cells to four cancerous stages based on the penetration spectrums.

The color gaining step is: raising the color differences of cells images of the four cancerous stages.

The image reproduction step is: utilizing a principal component analysis, a linear regression and a chromatic adaptation transform to obtain the spectral representations of the contoured suspected cancerous cells.

The cell determining step is: distinguishing the cancerous stages of the suspected cancerous cells based on the spectral database of cancerous cells.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
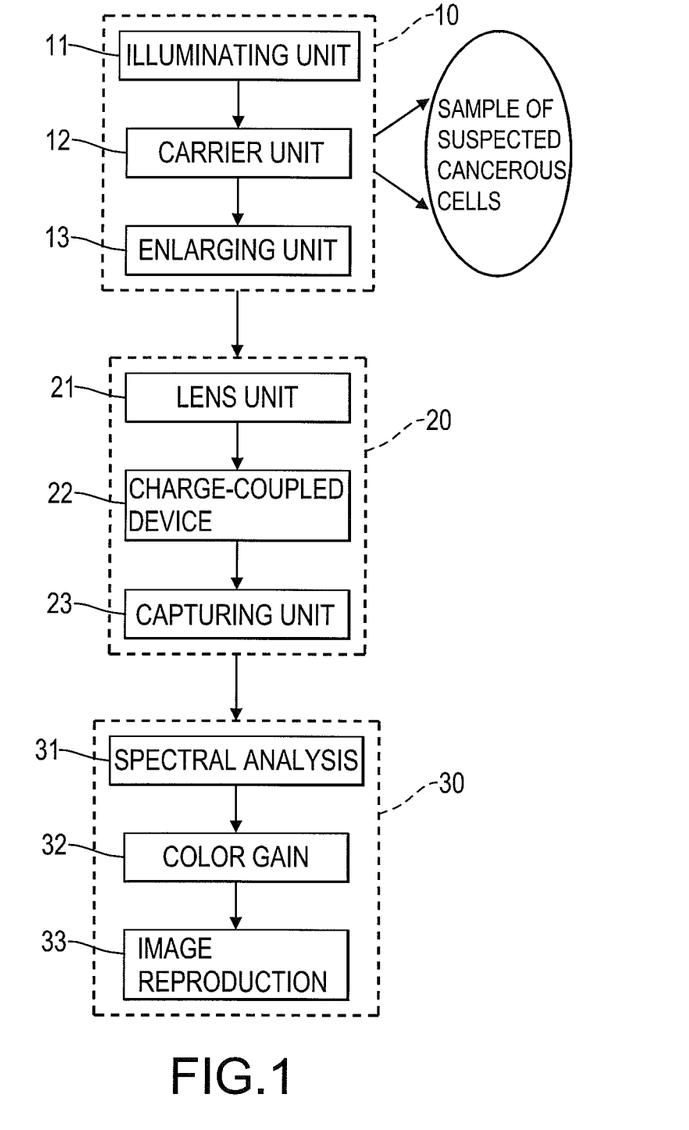
FIG. 1 is a diagram of an image analysis system for determining cancerous cells in accordance with the present invention.

With reference to FIG. 1, an image analysis system for determining cancerous cells in accordance with the present invention comprises an acquisition module 10, an image capturing module 20 and a multi-spectral image reproduction module 30.

Figure 2:
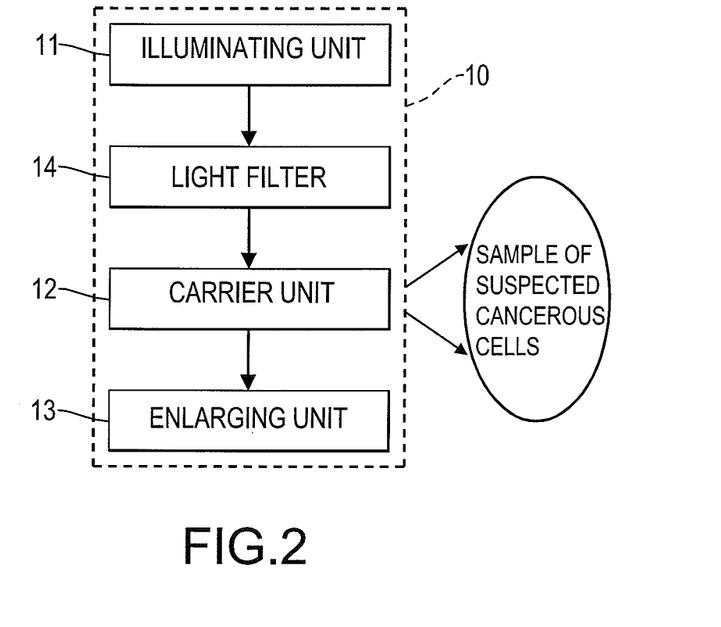
FIG. 2 is a diagram of an acquisition module of the image analysis system for determining cancerous cells in accordance with the present invention.

The acquisition module 10 includes a carrier unit 12, an illuminating unit 11 and an enlarging unit 13. The carrier unit 12 is provided for loading a sample of suspected cancerous cells. The illuminating unit 11 is located below the carrier unit 12 and is provided with a lighting source penetrating the sample of the suspected cancerous cells from a bottom of the carrier unit 12. The enlarging unit 13 is located at the carrier unit 12 for enlarging an image of the sample of the suspected cancerous cells to be recognized.

Preferably, the acquisition module 10 further includes a light filter 14 located at a projection path of the illuminating unit 11. The light filter 14 filtrates the light source of the illuminating unit 11 to maintain a specific band of the light source. The light filter 14 can provide the specific band of the light source to the sample of the suspected cancerous cells on the carrier unit 12 for raising a color difference. The light filter 14 can be chosen from a color filters set comprising a red filter, a green filter, a blue filter, a cyanine filter, a purple filter, a yellow filter or a combination of the above filters. The illuminating unit 11 can also be replaced by an illuminator of a different color to provide a specific band of the light source.

The image capturing module 20 is located at an output path of the acquisition module 10 and includes a lens unit 21, a charge-coupled device 22 and a capturing unit 23. The charge-coupled device 22 is composed of multiple charge-coupled units to be arranged in rows and columns to form a matrix. The charge-coupled units record an image of multiple pixels to form a digital graph. The charge-coupled device 22 receives an enlarged image of the sample of the suspected cancerous cells from the enlarging unit 13. Preferably, the charge-coupled device 22 determines the enlarged image provided from the enlarging unit 13, while the lighting source of the illuminating unit 11 penetrates through the sample to generate the image, and the image is enlarged by the enlarging unit. The lens unit 21 is mounted on the charge-coupled device 22 and is focused on the enlarged image to sharpen the enlarged image and transmits the sharpened enlarged image of the suspected cancerous cells to the charge-coupled device 22. Preferably, the lens unit 21 is focused on the enlarged image, which is generated by the lighting source of the illuminating unit 11 penetrating through the sample on the carrier unit 12. Alternatively, the enlarged image is reflected/transmitted from the sample from the carrier unit 12. The capturing unit 23 is connected with the charge-coupled device 22 to capture the sharpened enlarged image of the suspected cancerous cells. The capturing unit 23 can be chosen from a camera or a spectrophotometer. Preferably, the capturing unit 23 is a spectrophotometer of the CS1000A type.

The multi-spectral image reproduction module 30 retreats the sharpened enlarged image of the suspected cancerous cells captured from the capturing unit 23 with a spectral analysis 31, a color gain 32 and an image reproduction 33, such that the reproduction of the enlarged image of the suspected cancerous cells is provided for a doctor to recognize a stage of the suspected cancerous cells.

The spectral analysis 31, the color gain 32 and the image reproduction 33 are conventional arts and will not be further described hereinafter.

Compared with conventional biomedical determining devices or methods, the present invention does not require complicated chemical steps, takes shorter time to determine the cells, and provides non-contact determination without polluting the cells sample. Compared with the conventional SVM determination and the conventional Winer's estimation method, the present invention requires simpler equipment and less parameters, and does not need to control the exposure time of the charge-coupled device 22.

With reference to FIGS. 3 to 7, a method for determining cancerous cells in accordance with the present invention comprises a spectral database establishing procedure 40 and a cell determining procedure 50. The spectral database establishing procedure 40 is provided for establishing a spectral database of the cancerous cells. Then, the cell determining procedure 50 can recognize the suspected cancerous cells based on the spectral database.

Figure 3:
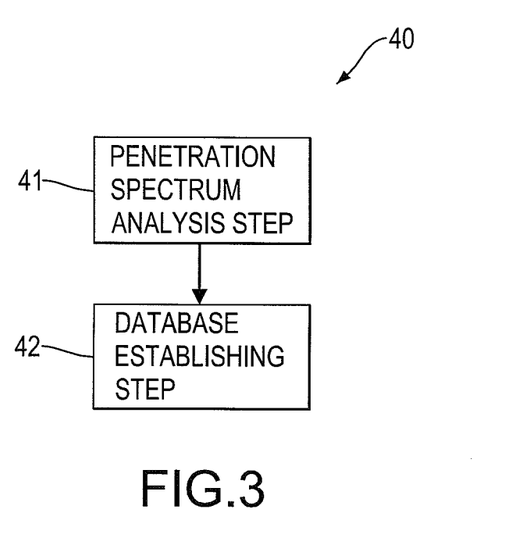
FIG. 3 is a block diagram of establishing a spectral database of cancerous cells procedure of a method for determining cancerous cells in accordance with the present invention.

The spectral database establishing procedure of cancerous cells 40 includes an advanced recognition treatment, a penetration spectrum analysis step 41 and a database establishing step 42.

Figure 4:
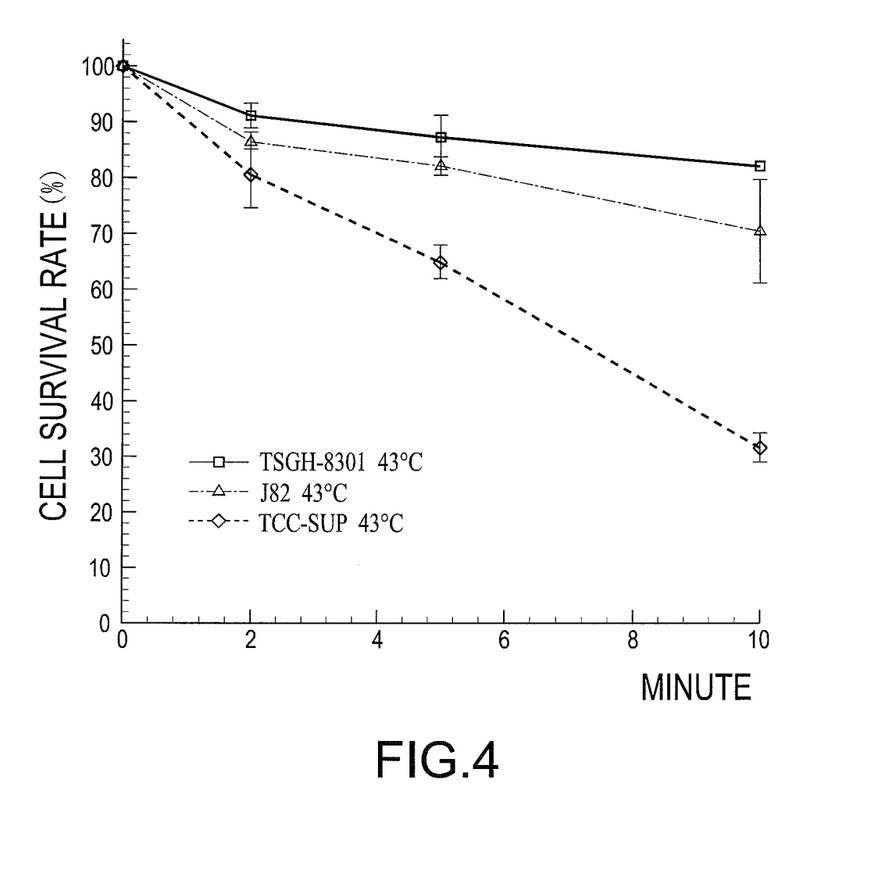
FIGS. 4 and 5 are curve diagrams based on the survival rate and the temperature keeping time of cancerous bladder cells at different temperatures.
Figure 5:
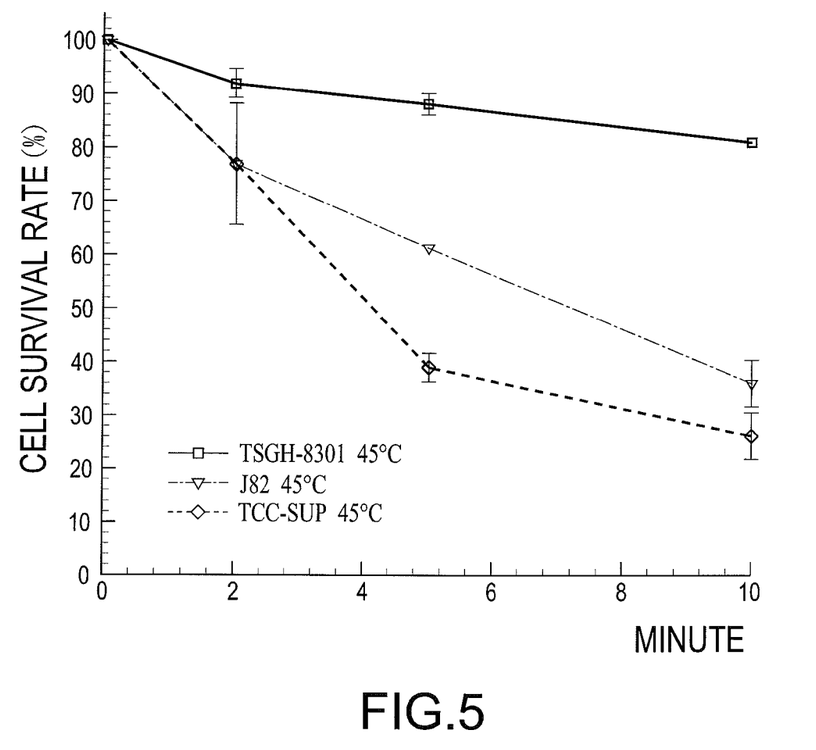

The advanced recognition treatment can be achieved with various ways, such as a thermal response test, cytopathology, flow cytometer, or spectral cytopathology. Preferably, the cell thermal response test is taken as an example to describe the present invention: treating the cancerous cells with different thermal temperatures and for different durations of time to calculate a cell survival rate, and painting a curve diagram based on a temperature survival rate and a temperature keeping time. With reference to FIGS. 4 and 5, for instance, in the thermal response test, bladder cells of the second cancerous stage (testing number TSGH-8301), bladder cells of the third cancerous stage (testing number J82) and bladder cells of the fourth cancerous stage (testing number TCC-SUP) are heated to 43° C. to obtain a curve diagram of FIG. 4 and are heated to 45° C. to obtain a curve diagram of FIG. 5 based on the survival rates and the temperature keeping time, such that the states of the bladder cells of the second, the third and the fourth cancerous stages are recognized. With reference to the following table 1, the results cooperate with an Arrhenius model to calculate quantified data of activation energy and frequency factor. The bladder cells of the first cancerous stage can be calculated by an algorithm to compare normal cells and the bladder cells of the second cancerous stage. Therefore, the four cancerous stages of the cancerous cells are defined.

TABLE 1

| | Activation Energy | Frequency Factor |
|---|---|---|
| TSGH-8301 | 230.92 | $3.471 \times 10^{34}$ |
| J82 | 209.18 | $1.61 \times 10^{31}$ |
| TCC-SUP | 170.88 | $1.519 \times 10^{25}$ |

Figure 6:
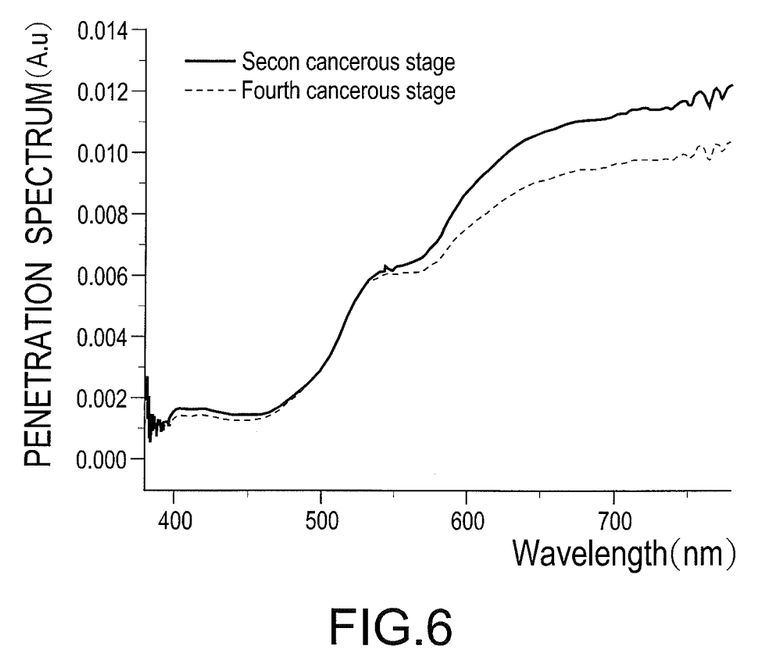
FIG. 6 is a curve diagram of penetration spectrums of the bladder cells of the second cancerous stage and the fourth cancerous stage.

The penetration spectrum analysis step 41 is: utilizing a multi-spectral analysis analyzing the cells of the four cancerous stages to calculate an average penetration spectrum. With reference to FIG. 6, a solid line represents the penetration spectrum of the bladder cells of the second cancerous stage and a broken line represents the penetration spectrum of the bladder cells of the fourth cancerous stage. Therefore, the spectrum features of the cells of the four cancerous stages are obtained.

The database establishing step 42 is: establishing a cancerous spectrum database based on the spectrum features of the cells of the four cancerous stages.

Figure 7:
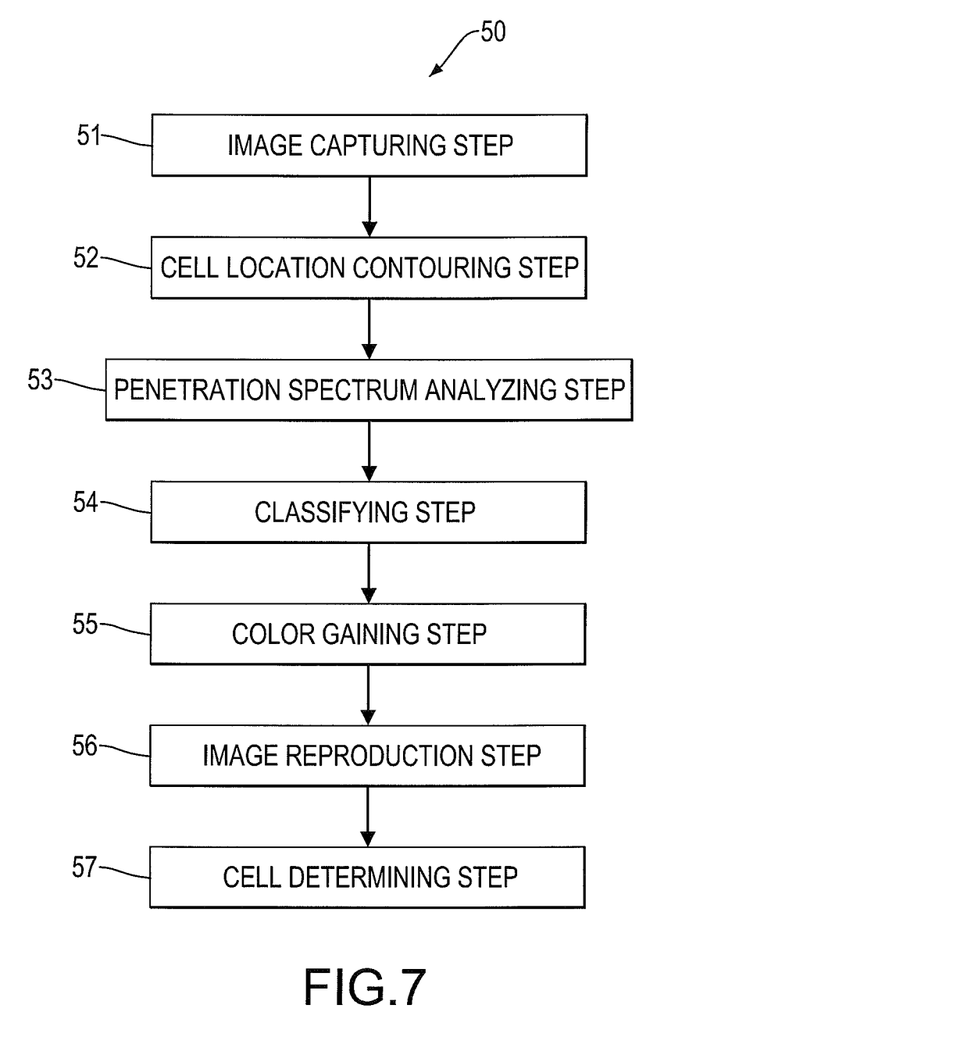
FIG. 7 is a block diagram of the cell determining procedure of multi-spectral image reproduction of the method for determining cancerous cells in accordance with the present invention.

Based on the cancerous spectrum database, the suspected cancerous cells can be recognized with multi-spectral image reproduction. The cell determining procedure 50 of the multi-spectral image reproduction includes an image capturing step 51, a cell location contouring step 52, a penetration spectrum analyzing step 53, a classifying step 54, a color gaining step 55, an image reproduction step 56 and a cell determining step 57.

The image capturing step 51 is: capturing an image of suspected cancerous cells.

The cell location contouring step 52 is: utilizing an algorithm to contour the suspected cancerous cells in the image to recognize the locations of the suspected cancerous cells.

The penetration spectrum analyzing step 53 is: utilizing the multi-spectral analysis analyzing the contoured suspected cancerous cells in the image to obtain the average penetration spectrum of the contoured suspected cancerous cells.

The classifying step 54 is: classifying the image of the suspected cancerous cells to four cancerous stages based on a descending trend of the penetration spectrums. With the development of cancerous cells, a nucleus of the cancerous cells will grow bigger and bigger, and the nucleus will gradually occupy a greater and greater proportion of the volume of the cancerous cells. As a penetration rate of the cytoplasm is lower than that of the nucleus, the descending trend of the penetration spectrums can be utilized to classify the image of the suspected cancerous cells.

The color gaining step 55 is: raising the color differences of cells images of the four cancerous stages. The treatments for raising the color differences can be a multi-threshold setting, external filtering, contour determining, color space conversion or interference removing.

The image reproduction step 56 is: utilizing a principal component analysis, a linear regression and a chromatic adaptation transform to obtain the representations of the contoured suspected cancerous cells. The principal component analysis, the linear regression and the chromatic adaptation transform are conventional arts and are not further described hereinafter.

The cell determining step 57 is: distinguishing the cancerous stages of the suspected cancerous cells based on the spectral database of cancerous cells.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An image analysis system for determining cancerous cells comprising:
    an acquisition module including:
        a carrier unit loading a sample of suspected cancerous cells;
        an illuminating unit illuminating the sample of the suspected cancerous cells on the carrier unit as a lighting source; and
        an enlarging unit disposed on the carrier unit, with the enlarging unit enlarging an image of the sample of the suspected cancerous cells to be recognized;
    an image capturing module located at an output path of the acquisition module and including:
        a charge-coupled device directly receiving an enlarged image of the sample of the suspected cancerous cells from the enlarging unit;
        a lens unit mounted on the charge-coupled device and focused on the enlarged image to sharpen the enlarged image and transmit the sharpened enlarged image of the suspected cancerous cells to the charge-coupled device; and
        a capturing unit connected with the charge-coupled device, with the capturing unit capturing the sharpened enlarged image of the suspected cancerous cells;
    a multi-spectral image reproduction module utilizing a spectral analysis, a color gain and an image reproduction to retreat the sharpened enlarged image of the suspected cancerous cells captured from the capturing unit, contouring the suspected cancerous cells in the sharpened enlarged image to recognize locations of the suspected cancerous cells, analyzing the contoured suspected cancerous cells in the sharpened enlarged image to obtain an average penetration spectrum of the contoured suspected cancerous cells, classifying the sharpened enlarged image of the suspected cancerous cells to four cancerous stages based on a descending trend of the average penetration spectrum, raising color differences of the suspected cancerous cells of the four cancerous stages, and obtaining representations of the contoured suspected cancerous cells to determine one of the four cancerous stages to which the suspected cancerous cells pertains based on a spectral database of cancerous cells.

2. The image analysis system as claimed in claim 1, wherein the capturing unit is chosen from a camera or a spectrophotometer.

3. The image analysis system as claimed in claim 1, wherein the enlarged image determined by the charge-coupled device is provided from the enlarging unit while the lighting source of the illuminating unit penetrates through the sample to generate the image, and wherein the image is enlarged by the enlarging unit.

4. The image analysis system as claimed in claim 1, wherein the lens unit is focused on the enlarged image transmitted from the carrier unit.

5. A method for determining cancerous cells comprising: a spectral database establishing procedure of cancerous cells including a penetration spectrum analysis step: utilizing a multi-spectral analysis analyzing the cancerous cells of four cancerous stages to calculate an average penetration spectrum to obtain spectrum features of the cells of the four cancerous stages; and a database establishing step: establishing a cancerous spectrum database based on the spectrum features of the cells of the four cancerous stages; a cell determining procedure of multi-spectral image reproduction, which is based on the cancerous spectrum database, including: an image capturing step: capturing a sharpened enlarged image of suspected cancerous cells; a cell location contouring step: utilizing an algorithm to contour the suspected cancerous cells in the image to recognize the locations of the suspected cancerous cells; a penetration spectrum analyzing step: utilizing the multi-spectral analysis analyzing the contoured suspected cancerous cells in the image to obtain the average penetration spectrum of the contoured suspected cancerous cells; a classifying step: classifying the image of the suspected cancerous cells to four cancerous stages based on a descending trend of the average penetration spectrum; a color gaining step: raising the color differences of the suspected cancerous cells of the four cancerous stages; an image reproduction step: utilizing a principal component analysis, a linear regression and a chromatic adaptation transform to obtain the representations of the contoured suspected cancerous cells; and a cell determining step: distinguishing the cancerous stages of the suspected cancerous cells based on the spectral database of cancerous cells.

* * * * *